United States Patent
Hu et al.

(10) Patent No.: US 12,459,954 B2
(45) Date of Patent: Nov. 4, 2025

(54) CRYSTALLINE FORM A OF GLP-1 RECEPTOR AGONIST AND PREPARATION METHOD THEREFOR

(71) Applicant: Hangzhou Zhongmei Huadong Pharmaceutical Co., Ltd., Zhejiang (CN)

(72) Inventors: Haiwen Hu, Zhejiang (CN); Li Fang, Zhejiang (CN); Fan Hu, Zhejiang (CN); Fenfen Chen, Zhejiang (CN); Xinjie Zhou, Zhejiang (CN)

(73) Assignee: Hangzhou Zhongmei Huadong Pharmaceutical Co., Ltd., Zhejiang (CN)

( * ) Notice: Subject to any disclaimer, the term of this patent is extended or adjusted under 35 U.S.C. 154(b) by 615 days.

(21) Appl. No.: 17/995,090

(22) PCT Filed: Mar. 2, 2021

(86) PCT No.: PCT/CN2021/078622
§ 371 (c)(1),
(2) Date: Sep. 29, 2022

(87) PCT Pub. No.: WO2021/196949
PCT Pub. Date: Oct. 7, 2021

(65) Prior Publication Data
US 2023/0174546 A1   Jun. 8, 2023

(30) Foreign Application Priority Data

Apr. 1, 2020 (CN) .......................... 202010248808.7

(51) Int. Cl.
*C07D 491/056* (2006.01)

(52) U.S. Cl.
CPC ...... *C07D 491/056* (2013.01); *C07B 2200/13* (2013.01)

(58) Field of Classification Search
CPC .................. C07D 491/056; C07B 2200/13
See application file for complete search history.

(56) References Cited

U.S. PATENT DOCUMENTS

| | | | |
|---|---|---|---|
| 4,080,472 A | 3/1978 | Bohuon | |
| 5,985,584 A | 11/1999 | Sarokin | |
| 6,166,042 A | 12/2000 | Ikeda et al. | |
| 6,168,043 B1 | 1/2001 | Yen et al. | |
| 6,172,090 B1 | 1/2001 | Ikeda et al. | |
| 6,303,146 B1 | 10/2001 | Bonhomme et al. | |
| 7,727,983 B2 | 6/2010 | Mjalli et al. | |
| 7,790,714 B2 | 9/2010 | Mjalli et al. | |
| 7,906,507 B2 | 3/2011 | Mjalli et al. | |
| 8,236,345 B2 | 8/2012 | Lewis et al. | |
| 8,383,644 B2 | 2/2013 | Mjalli et al. | |
| 8,524,708 B2 | 9/2013 | Mjalli et al. | |
| 8,703,766 B2 | 4/2014 | Mjalli et al. | |
| 8,933,222 B2 | 1/2015 | Mjalli et al. | |
| 8,987,295 B2 | 3/2015 | Mjalli et al. | |
| 9,120,813 B2 | 9/2015 | Mjalli et al. | |
| 9,175,003 B2 | 11/2015 | Mjalli et al. | |
| 9,198,901 B2 | 12/2015 | Almariego et al. | |
| 2011/0064806 A1 | 3/2011 | Polisetti et al. | |
| 2011/0118180 A1 | 5/2011 | Silvestre et al. | |
| 2011/0160198 A1* | 6/2011 | Mjalli | A61P 9/10 544/405 |
| 2012/0295846 A1 | 11/2012 | Hagendorf et al. | |
| 2015/0313908 A1 | 11/2015 | Mjalli et al. | |
| 2021/0023072 A1 | 1/2021 | Freeman et al. | |
| 2023/0174547 A1 | 6/2023 | Hu et al. | |

FOREIGN PATENT DOCUMENTS

| | | |
|---|---|---|
| CN | 102378574 B | 11/2013 |
| CN | 104202977 A | 12/2014 |
| CN | 104968341 A | 10/2015 |
| EP | 2324853 A1 | 5/2011 |
| JP | 2007314551 A | 12/2007 |
| JP | 2009507927 A | 2/2009 |
| WO | WO-0042026 A1 | 7/2000 |
| WO | WO-2005095381 A1 | 10/2005 |
| WO | WO-2007033266 A2 | 3/2007 |
| WO | WO-2007058387 A1 | 5/2007 |
| WO | WO-2009111700 A2 | 9/2009 |
| WO | WO-2010114824 A1 | 10/2010 |
| WO | WO-2011031620 A1 | 3/2011 |
| WO | WO-2011156655 A2 | 12/2011 |
| WO | WO-2012156312 A1 | 11/2012 |
| WO | WO-2013142569 A1 | 9/2013 |
| WO | WO-2014113357 A1 | 7/2014 |
| WO | WO-2019217165 A1 | 11/2019 |

(Continued)

OTHER PUBLICATIONS

Ahren. GLP-1 for type 2 diabetes. Exp Cell res. 317(9):1239-1245 (2011).
Berge et al. Pharmaceutical Salts. Journal of Pharmaceutical Sciences 66(1):1-19 (Jan. 1977).
Davies et al. Effect of Oral Semaglutide Compared With Placebo and Subcutaneous Semaglutide on Glycemic Control in Patients With Type 2 Diabetes a Randomized Clinical Trial. 318(15):1460 (2017).
Edmonds et al. Oral GLP-1 Modulators for the Treatment of Diabetes. Annual Reports in Medicinal Chemistry 48:119-130 (2013).
Freeman et al., Abstract—TTP3859: Identification of a Non-Peptide GLP-1 Receptor Agonist That Enhances Glycemic Control in vivo, 4th G Protein-Coupled Receptors: An ASPET Colloquium, Apr. 24-25, 2013 (2013).

(Continued)

*Primary Examiner* — Timothy R Rozof
(74) *Attorney, Agent, or Firm* — WILSON SONSINI GOODRICH & ROSATI

(57) ABSTRACT

The invention relates to a crystal form A of (S)-2-(3S,8S)-3-(4-(3,4-dichlorobenzyloxy)phenyl-7-((S)-1-phenylpropyl)-2,3,6,7,8,9-hexahydro-[1,4]-dioxino[2,3-g]isoquinolin-8-ylformylamino)-3-(4-(2,3-dimethylpyridin-4-yl)phenyl) propionic acid ("OAD2"), and methods of preparation thereof. Crystal form A may be useful in the treatment of various conditions and metabolic disorders including, but not limited to, type 2 diabetes.

7 Claims, 2 Drawing Sheets

(56) References Cited

FOREIGN PATENT DOCUMENTS

| WO | WO-2021196949 A1 | 10/2021 |
| WO | WO-2021196951 A1 | 10/2021 |

OTHER PUBLICATIONS

Freeman et al., Is Less More? Learning to Dose the Oral, Nonpeptide GLP-1R Agonist, TTP273 in Type 2 Diabetics, Poster presented at the 77th Scientific Sessions of the American Diabetes Association in San Diego. CA, Jun. 9-13, 2017.
Freeman et al., Oral Small Molecule GLP-1 Receptor (GLP-1R) Agonists for Type 2 Diabetes (T2DM) with Negligible Nausea and Vomiting, Poster presented at Keystone Conference in La Jolla, CA, Apr. 17-20, 2016.
Freeman et al., Preclinical Findings with Oral GLP-1 Receptor Agonist TTP273 Reinforce Importance of Neuro-Enteroendocrine Signaling, Poster presented at the 76th Scientific Sessions of the American Diabetes Association, Jun. 11-13, 2016.
Freeman et al., TTP273: Oral, G-protein Pathway Selective, Clinical-Stage GLP-1 Receptor (GLP-1R) Agonist, Poster presented at G Protein-Coupled Receptors: Structure, Signaling and Drug Discovery, Keystone Symposia on Molecular and Cellular Biology, Keystone, Colorado, Feb. 22, 2016.
Freeman et al., TTP273. Oral (Nonpeptide) GLP-1R Agonist. Improved Glycemic Control without Nausea and Vomiting in Phase 2, Poster presented at the 77th Scientific Sessions of the American Diabetes Association in San Diego, CA, Jun. 9-13, 2017.
Freeman et al., TTP3859: Identification of a Non-Peptide GLP-1 Receptor Agonist That Enhances Glycemic Control in vivo, 4th G Protein-Coupled Receptors: An ASPET Colloquium, Apr. 24-25, 2013.
Gustavson et al., Abstract—TTP054. a Novel, Orally-Available Glucagon-Like Peptide-1 (GLP-1) Agonist, Lowers HbA1 c in Subjects with Type 2 Diabetes Mellitus (T2DM). Jun. 2014. ADA 74th Scientific Sessions (156-OR).
Gustavson et al., Abstract—TTP273, an Orally-Available Glucagon-Like Peptide-1 (GLP-1) Agonist, Notably Reduces Glycemia in Subjects with Type 2 Diabetes Mellitus (T2DM). Jun. 2014. ADA 74th Scientific Sessions. (155-OR).
Gustavson et al., TTP054, a Novel, Orally-Available Glucagon-Like Peptide-1 (GLP-1) Agonist, Lowers HbA1c in Subjects with Type 2 Diabetes Mellitus (T2DM). Jun. 2014. ADA 74th Scientific Sessions. (156-OR).
Gustavson et al. TTP054, a Novel, Orally-Available Glucagon-like Peptide-1 (GLP-1) Agonist, Lowers HbA1c in Subjects with Type 2 Diabetes Mellitus (T2DM). Diabetes 63(Suppl. 1):A41-A42 (Jun. 2014).
Gustavson et al., TTP273, an Orally-Available Glucagon-Like Peptide-1 (GLP-1) Agonist, Notably Reduces Glycemia in Subjects with Type 2 Diabetes I Mellitus (T2DM). Jun. 2014. ADA 74th Scientific Sessions. (155-OR).
Nauck et al., Efficacy and safety comparison of liraglutide, glimepiride, and placebo, all in combination with metformin, in type 2 diabetes: the LEAD (liraglutide effect and action in diabetes)-2 study. Diabetes Care 32(1):84-90 (2009).
PCT/CN2021/078622 International Search Report and Written Opinion dated May 26, 2021.
PCT/CN2021/078658 International Search Report and Written Opinion dated May 21, 2021.
Sivertsen et al. The effect of glucagon-like peptide 1 on cardiovascular risk. Nature Reviews Cardiology 9(4):209-222 (2012).
Su et al., Boc5, a non-peptidic glucagon-like Peptide-1 receptor agonist, invokes sustained glycemic control and weight loss in diabetic mice. PLOS One 3(8): e2892 (2008).
Wootten et al., Differential Activation and Modulation of the Glucagon-Like Peptide-1 Receptor by Small Molecule Ligands. Mol Pharmacol 83:822-834 (2013).
Zhao et al. Activation of the GLP-1 receptor by a non-peptidic agonist. Nature 577(7790):432-436 (2020).
Stahl, Heinrich P, et al., Usage frequency of acids and bases for forming drug salts. Handbook of Pharmaceutical Salts. Verlag Helvetica Chimica Acta, Zurich (pp. 329-350) (2002).
Caira. Crystalline Polymorphism of Organic Compounds. Topics in Current Chemistry. 198:163-208 (Jan. 1998).
Anderson, Bradley D. et al. Chapter 34: Preparation of water-soluble organic compounds by salt formation. Latest Drug Discovery Chemistry 2:347-365 (1999).
Chapter 4: Pharmaceutical crystallization method. Preparation of organic compound crystal—Principle and know-how:57-79 (2008).
General Test methods. Sixteenth Revised Japanese Pharmacopoeia:64-68 (2011).

\* cited by examiner

CRYSTALLINE FORM A OF GLP-1 RECEPTOR AGONIST AND PREPARATION METHOD THEREFOR

TECHNICAL FIELD

The invention belongs to the technical field of medicine, and particularly relates to a crystal form A of (S)-2-(3S,8S)-3-(4-(3,4-dichlorobenzyloxy)phenyl-7-((S)-1-phenylpropyl)-2,3,6,7,8,9-hexahydro-[1,4]-dioxino[2,3-g]isoquinolin-8-ylformylamino)-3-(4-(2,3-dimethylpyridin-4-yl)phenyl) propionic acid ("OAD2") and the preparation methods thereof. Crystal form A may be useful in the treatment of various conditions and metabolic disorders including, but not limited to, type 2 diabetes.

BACKGROUND OF THE INVENTION (S)-2-(3S,8S)-3-(4-(3,4-dichlorobenzyloxy)phenyl-7-((S)-1-phenylpropyl)-2,3,6,7,8,9-hexahydro-[1,4]-dioxino[2,3-g]isoquinolin-8-ylformylamino)-3-(4-(2,3-dimethylpyridin-4-yl)phenyl)propionic acid dihydrochloride (herein referred to as OAD2 dihydrochloride), has an empirical formula of $C_{50}H_{49}Cl_4N_3O_6$, a molecular weight of 929.76, and the following chemical structure:

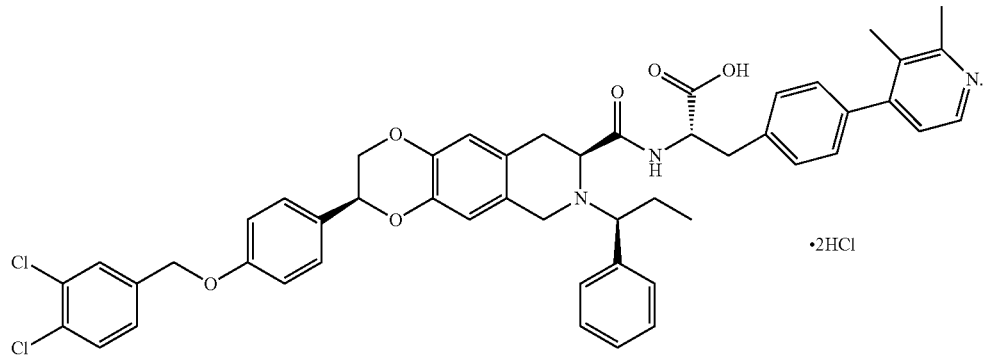 [SMILES: CC[C@@H](c1ccccc1)N1Cc2cc3c(cc2C[C@H]1C(=O)N[C@@H](Cc1ccc(-c2ccnc(C)c2C)cc1)C(=O)O)OC[C@H](c1ccc(OCc2ccc(Cl)c(Cl)c2)cc1)O3]

OAD2 dihydrochloride is an orally available, non-peptide glucagon-like peptide 1 (GLP-1) receptor agonist.

Although OAD2 has already been described in a patent for invention CN102378574B, the crystal form(s) of OAD2 have not been systematically studied.

It has been discovered that the dihydrochloride salt of OAD2 absorbs moisture and is difficult to be filtered, dried and further processed, which may have an impact on its purity and cost of production. Therefore, it is desirable to further study OAD2 to potentially improve the purity, stability and morphology of the pharmaceutical active ingredient.

SUMMARY OF THE INVENTION

The invention provides a crystal form A of OAD2 and the preparation method thereof. The invention also provides a solid state form of OAD2, wherein the solid state form comprises crystal form A of OAD2.

The invention also provides use of a solid state form of OAD2 comprising crystal form A in the preparation of a medicament to treat a disorder or condition where activation of the GLP-1 receptor is beneficial.

The invention further provides a method for preparing the crystal form A of OAD2. The invention also provides a method of making a solid state form of OAD2 comprising crystal form A.

The invention also provides a pharmaceutical composition comprising the crystal form A of OAD2, wherein the pharmaceutical composition comprises a therapeutically effective amount of the crystal form A of OAD2, and optionally a pharmaceutically acceptable carrier. The pharmaceutical composition may be prepared according to methods known in the art. The invention also provides a pharmaceutical composition comprising a solid state form of OAD2, wherein the solid state form comprises crystal form A. The invention also provides a method of producing a pharmaceutical composition comprising a solid state form of OAD2 comprising crystal form A of OAD2.

The invention also provides use of the crystal form A of OAD2 for the preparation of a GLP-1 receptor agonist.

The invention also provides use of the crystal form A of OAD2 for the preparation of a medicament. In an embodiment, the medicament may be for treating diabetes.

The invention also provides methods of treatment comprising administering to a human in need thereof a therapeutically effective amount of a solid state form of OAD2, wherein the solid state form of OAD2 comprises crystal form A. The methods of treatment may be useful to treat a disorder or condition where activation of the GLP-1 receptor is beneficial.

These and other embodiments of the invention are described in greater detail in the detailed description of the invention which follows.

The crystal form A of OAD2 may have certain improved properties relative to OAD2 dihydrochloride salt. For example, crystal form A of OAD2 exhibited no measurable amount weight increase from absorption of water after 5 days under certain conditions while OAD2 dihydrochloride salt exhibited an 8.3% increase of hygroscopic weight after 5 days under similar conditions. Further, the process of purifying OAD2 may be simpler and less costly than the process for purifying OAD2 dihydrochloride.

DETAILED DESCRIPTION OF THE INVENTION

The invention will be further illustrated by combining the following specific examples. The following examples are used to explain the method of the invention and the core concept thereof, and for those skilled in the art, any possible change or substitution without departing from the inventive concept will fall within the protection scope of the invention. In the following examples, where the specific conditions of the experimental methods are not indicated, they are typically the conventional conditions, or are those recommended by the raw material or commodity manufactures; and the solvents without indicating the source are typically conventional solvents that are commercially available.

In the invention, "crystals" or "crystal form" is identified by the characterization of the indicated X-ray powder diffraction pattern as shown. Those skilled in the art will appreciate that the experimental error of the characterization data typically depends on the conditions of the instrument, the preparation and purity of the sample, etc. Particularly, it is well known to those skilled in the art that X-ray powder diffraction pattern usually changes with the variation of experimental conditions, and accordingly the peak intensity per se cannot be identified as the only or decisive factor. The experimental error of peak angle is usually within 5% or less, and the data of peak angle usually allows for an error of 0.2. In addition, owning to the influence of experimental factors such as the height of the sample, the peak angles may shift as a whole, and thus a certain shift is usually allowed. Those skilled in the art will appreciate that any crystal form having characteristic peaks same as or similar to those as shown in the X-ray powder diffraction pattern of the invention will fall within the protection scope of the invention. The value of the melting point as illustrated in the DSC thermogram should be interpreted as a value within a range of that numerical ±3.0° C., and preferably within a range of that numerical ±1.0° C.

The term "therapeutically effective amount" is used herein to denote the amount of OAD2 that will elicit the therapeutic response of a subject that is being sought. In an embodiment, the therapeutic response may be agonizing the GLP-1 receptor.

The dihydrochloride salt of OAD2 may be obtained according to the methods as described in patent CN102378574B or in the related international publication WO 2010/114824, which are incorporated herein by reference in their entirety.

Form A

Figure 1:
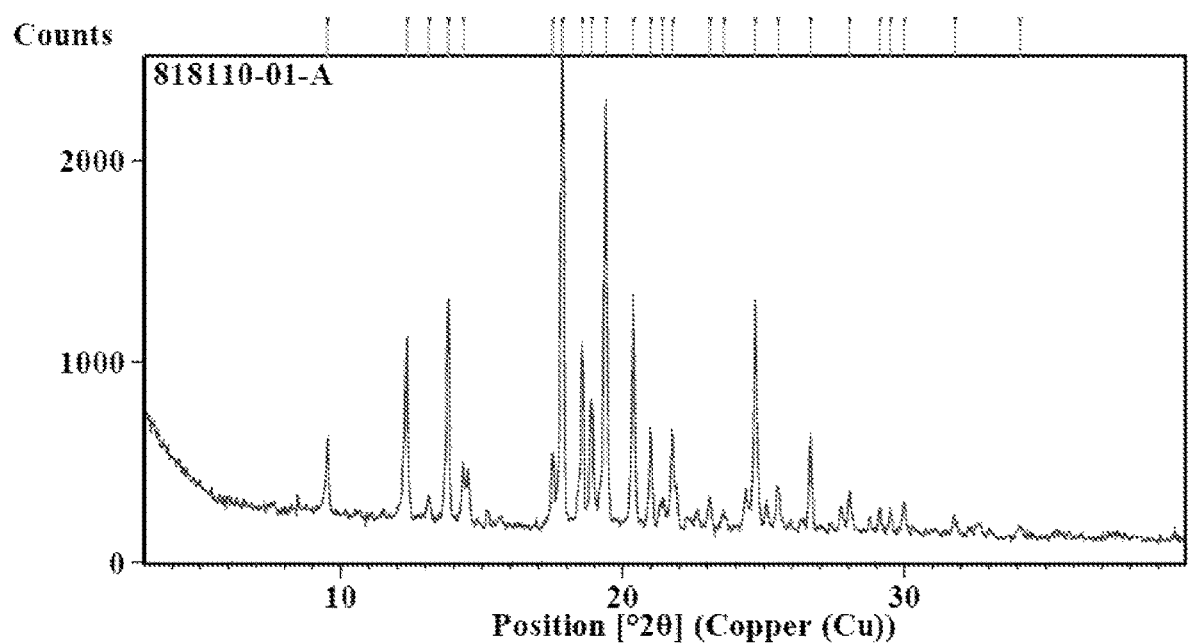
FIG. 1 shows the X-ray powder diffraction pattern of the crystal form A of OAD2 of the invention.

The invention provides a crystal form A of OAD2. The crystal form A has an X-ray powder diffraction (XRPD) pattern comprising characteristic peaks at the following 2θ angles: 9.53°, 12.32°, 13.80°, 17.84°, 18.56°, 19.40°, 20.38°, 20.99°, 21.78°, and 24.69°±0.2, as determined by Cu-Kα radiation. In an embodiment, the invention provides a crystal form A of OAD2 having an XRPD pattern comprising characteristic peaks at the following 2θ angles: 17.84°, 19.40°, and 20.38±0.2. In another embodiment, the invention provides a crystal form A of OAD2 having an XRPD pattern comprising characteristic peaks at the following 2θ angles: 13.80° and 24.69±0.2. In another embodiment, the invention provides a crystal form A of OAD2 having an XRPD pattern comprising characteristic peaks at the following 2θ angles: 12.32°, 18.56°, 20.99°, and 21.78°±0.2. In another embodiment, the invention provides a crystal form A of OAD2 characterized by an XRPD pattern as shown in FIG. 1.

Figure 2:
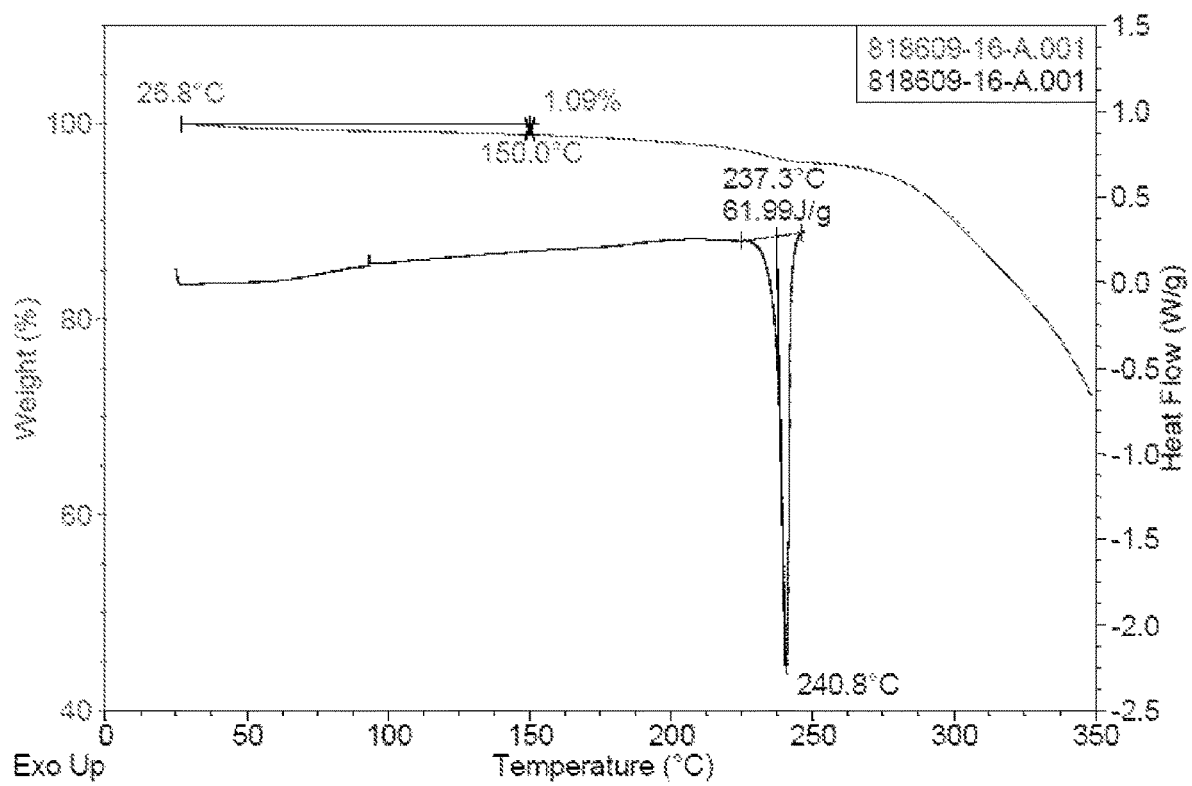
FIG. 2 shows the DSC thermal analysis and thermogravimetric analysis TGA thermograms of the crystal form A of OAD2 of the invention.

As a specific embodiment, the DSC thermogram shows that the melting point of the crystal form A of OAD2 is 240.8° C. In another embodiment, the invention provides the crystal form A that is characterized by an endothermic peak at 240.8° C., as determined by DSC. In other embodiment, the invention provides crystal form A that is characterized by a DSC profile as shown in FIG. 2.

As a specific embodiment, the TGA thermogram shows that the crystal form A sample of OAD2 has 1.1% weight loss when heated to 150° C. In another embodiment, the invention provides the crystal form A that is characterized by about 1.1% weight loss between room temperature and 150° C., as determined by TGA. In another embodiment, the invention provides the crystal form A that is characterized by the TGA profiled as shown in FIG. 2.

As a specific embodiment, the crystal form A of OAD2 has the characteristic diffraction angles (2θ), interplanar spacing (d), and relative intense (%) as listed in Table 1.

TABLE 1

XRPD characterization data of crystal form A of OAD2

| Pos. [°2Th.] | Height [cts] | FWHM Left [°2Th.] | d-spacing [Å] | Rel. Int. [%] |
| --- | --- | --- | --- | --- |
| 9.53 | 385.38 | 0.1023 | 9.28 | 16.24 |
| 12.32 | 909.29 | 0.1023 | 7.19 | 38.31 |
| 13.10 | 126.69 | 0.1535 | 6.76 | 5.34 |
| 13.80 | 1103.80 | 0.1023 | 6.42 | 46.51 |
| 14.34 | 287.45 | 0.1023 | 6.18 | 12.11 |
| 17.50 | 370.64 | 0.1023 | 5.07 | 15.62 |
| 17.84 | 2373.46 | 0.1023 | 4.97 | 100.00 |
| 18.56 | 926.04 | 0.1023 | 4.78 | 39.02 |
| 18.90 | 644.93 | 0.1023 | 4.70 | 4.70 |
| 19.40 | 2137.03 | 0.1023 | 4.58 | 90.04 |
| 20.38 | 1173.82 | 0.1023 | 4.36 | 49.46 |
| 20.99 | 504.70 | 0.1279 | 4.23 | 21.26 |
| 21.40 | 135.47 | 0.1535 | 4.15 | 5.71 |
| 21.78 | 446.91 | 0.2047 | 4.08 | 18.83 |
| 23.09 | 160.92 | 0.1535 | 3.85 | 6.78 |
| 23.59 | 80.87 | 0.2558 | 3.77 | 3.41 |
| 24.69 | 1160.43 | 0.1023 | 3.61 | 48.89 |
| 25.50 | 226.72 | 0.1279 | 3.49 | 9.55 |
| 26.65 | 479.74 | 0.1279 | 3.34 | 20.21 |
| 28.04 | 211.01 | 0.1023 | 3.18 | 8.89 |
| 29.14 | 131.65 | 0.1535 | 3.07 | 5.55 |
| 29.50 | 123.59 | 0.1279 | 3.03 | 5.21 |
| 30.00 | 167.09 | 0.1023 | 2.98 | 7.04 |
| 31.78 | 93.32 | 0.1535 | 2.82 | 3.93 |
| 34.10 | 49.96 | 0.3070 | 2.63 | 2.10 |

In another embodiment, the invention provides the crystal form A of OAD2 that is characterized by at least two of the following features:
  i) an XRPD pattern having characteristic peaks at the following 2θ angles: 17.84°, 19.40°, and 20.38°±0.2;
  ii) a DSC profile as shown in FIG. 2; or
  iii) a TGA profile as shown in FIG. 2.

Pharmaceutical Compositions

The invention also provides a pharmaceutical composition comprising the crystal form A of OAD2, wherein the pharmaceutical composition comprises a therapeutically effective amount of the crystal form A of OAD2, and optionally a pharmaceutically acceptable carrier. The pharmaceutical composition may be prepared according to methods known in the art. Preferably, the crystal form A of OAD2 is 0.001%~99/o by weight of the pharmaceutical composition. The invention also provides a pharmaceutical composition comprising a solid state form of OAD2, wherein the solid state form comprises crystal form A. The invention also provides a method of producing a pharmaceutical composition comprising a solid state form of OAD2 comprising crystal form A of OAD2.

As a specific embodiment, the crystal form A of OAD2 is combined with one or more pharmaceutical acceptable carriers and formulated into any dosage form that is suitable for use in human or non-human animals.

Methods of Manufacture

The invention further provides a method for preparing the crystal form A of OAD2: dissolving OAD2 dihydrochloride in a mixed solvent of organic solvent and water, neutralizing the mixture with an alkaline solution, stirring to crystalize, and separating the precipitated crystals to give the crystal form A of OAD2.

As a specific embodiment, the organic solvent is one selected from the group consisting of 2-methyltetrahydrofuran, tetrahydrofuran, acetonitrile, and acetone, and preferably 2-methyltetrahydrofuran.

As a specific embodiment, the organic solvent and water are mixed at a ratio of 1:1. In another embodiment, the total volume of the organic solvent and water and the weight of OAD2 dihydrochloride salt are at a volume/weight ratio in the range of 4~8:1, wherein the volume is in unit of L and the weight is in unit of kg.

As a specific embodiment, in the neutralization step, the base is one selected from the group consisting of lithium hydroxide, sodium hydroxide, potassium hydroxide, sodium carbonate, and potassium carbonate, and preferably sodium hydroxide.

As a specific embodiment, the temperature of the neutralization and crystallization is in the range of 10~30° C.

Methods of Treatment

In another aspect, the present invention provides pharmaceutical compositions comprising a therapeutically effective amount of OAD2 wherein a therapeutically effective amount of OAD2 comprises a sufficient amount for the treatment of a condition or disorder where activation of the GLP-1 receptor is beneficial.

In another aspect, the invention also provides methods of treatment comprising administering to a human in need thereof a therapeutically effective amount of a solid state form of OAD2, wherein the solid state form of OAD2 comprises crystal form A. The methods of treatment may useful to treat a disorder or condition where activation of the GLP-1 receptor is beneficial, such as, but not limited to a disorder or condition is selected from the group consisting of: metabolic syndrome, glucose intolerance, hyperglycemia, dyslipidemia, diabetes mellitus type 1, diabetes mellitus type 2, hypertriglyceridemia, syndrome X, insulin resistance, impaired glucose tolerance (IGT), obesity, diabetic dyslipidemia, hyperlipidemia, arteriosclerosis, atherosclerosis, other cardiovascular diseases, hypertension, metabolic disorders that where activation of the GLP-1 receptor is beneficial, and complications resulting from or associated with diabetes, including, but not limited to, neuropathy, retinopathy, nephropathy, and impaired wound healing. In an embodiment, the condition treated is type 2 diabetes.

The solid state form of OAD2 of the present invention may be administered at a dosage level such that the amount of OAD2 administered is between 1 mg and 100 mg per day. The dosage may be individualized by the clinician based on the specific clinical condition of the subject being treated. Thus, it will be understood that the specific dosage level for any particular subject will depend upon a variety of factors including the activity of the specific compound employed, the age, body weight, general health, sex, diet, time of administration, route of administration, rate of excretion, drug combination and the severity of the particular disease undergoing therapy.

Beneficial Effect

OAD2 crystalline Form A has several improved properties compared to OAD2 dihydrochloride. For example, OAD2 crystalline Form A did not gain weight due to water absorption for 5 days under experimental conditions, while OAD2 dihydrochloride showed an 8.3% weight gain due to water absorption under similar conditions for 5 days. Furthermore, the method of purifying OAD2 can be simpler and less expensive than the method of purifying OAD2 bis-hydrochloride.

EXAMPLES

The present invention will be further described in detail below with specific embodiments. The following examples are used to understand the method and core idea of the present invention. For those skilled in the art, any possible changes or substitutions without departing from the concept of the present invention belong to the protection scope of the present invention. The experimental methods for which specific conditions are not indicated in the examples of the present invention are usually conventional conditions, or according to the conditions suggested by the raw material or commodity manufacturers; the reagents that do not indicate the source are usually conventional reagents that can be purchased through commercial channels.

Experimental Instruments and Protocols:

X-ray powder dfraction (XRPD): Empyren; test conditions: power 40 kV×250 mA, CuKα radiation; scanning range 3~40° (2θ); step width 0.02°; scanning speed 5/min; scanning method: continuous scanning.

Thermogravimetric analysis (TGA) and differential scanning calorimetry (DSC): collected on TA Q5000/5500 thermogravimetric analyzer and TA Q200/Q2000/2500 differential scanning calorimeter, respectively. See the table 2 below showing the test parameters.

TABLE 2

| DSC and TGA test parameters | | |
|---|---|---|
| Parameters | TGA | DSC |
| Method | Linear heating | Linear heating |
| Sample | Aluminum plate, open | Aluminum plate, covered/uncovered |
| Temperature | Room temperature - endpoint temperature | 25° C. - endpoint temperature |
| Scan rate (° C./min) | 10 | 10 |
| Gas protection | Nitrogen | Nitrogrn |

Example 1: Preparation of crystal form A of (S)-2-(3S,8S)-3-(4-(3,4-dichlorobenzyloxy)phenyl-7-((S)-1-phenylpropyl)-2,3,6,7,8,9-hexahydro-[1,4]-dioxino[2,3-g]isoquinolin-8-ylformylamino)-3-(4-(2,3-dimethylpyridin-4-yl)phenyl)propionic Acid Free Base (Referred as OAD2)

In a 1 L three neck bottle, 100 g OAD2 dihydrochloride salt (HPLC purity: 97.87%) was first charged, and then 2-methyltetrahydrofuran: water (at a weight ratio of 1:1, each 0.4 kg) were added and stirred until clear. The mixture was maintained at 20° C. A 2 N sodium hydroxide solution prepared by dissolving 9 g sodium hydroxide in water was added, and then the mixture was stirred at 20° C. to crystalize for 6 hours. After filtration and vacuum drying, crystal form A of the free base was obtained, yield: 88.4%. HPLC purity: 99.50%.

Example 2: Preparation of Crystal Form a of OAD2

In a 1 L three neck bottle, 100 g OAD2 dihydrochloride salt (HPLC purity: 97.57%) was first charged, and then acetonitrile:water (at a weight ratio of 1:1, each 0.8 kg) were added and stirred until clear. The mixture was maintained at 30° C. A 2 N sodium hydroxide solution prepared by dissolving 9 g sodium hydroxide in water was added, and then the mixture was stirred at 30° C. to crystalize for 6 hours. After filtration and vacuum drying, crystal form A of the free base was obtained, yield: 84.6%. HPLC purity: 99.0%.

Example 3: Study of Stability

The crystal form A of OAD2 was subject to a stability study. The crystal form A was tested stability in $H_2O$, SGF (simulated gastric fluid), FeSSIF (simulated intestinal fluid in the feeding state) and FaSSIF (simulated intestinal fluid in the fasting state). The chemical stability was expressed in the HPLC purity. The crystal form stability was expressed by detecting the change of crystal form by XPRD. The results were shown in Table 3, demonstrating that the crystal form A of the free base had good chemical stability, did not change the crystal form under various conditions, was not easy to absorb moisture, and was highly suitable for the preparation of a medicament.

TABLE 3

Study of stability of crystal form A of OAD2 free base

| Sample | Conditions | Time | HPLC purity (area %) | Change of crystal form |
|---|---|---|---|---|
| Crystal form A[1] (1#) | Initial | 0 d | 98.88 | no |
| | 25° C./75 ± 5% RH | 7 d | 98.90 | no |
| | Placed at room temperature and room humidity | 28 d | 98.69 | no |
| | Room temperature and room humidity ± 25° C./60% RH | 28 d + 7 d | 98.67 | no |
| | Successively suspended in SGF/FeSSIF/FaSSIF/water | 1 d | / | no |
| Crystal form A (2#) | Initial | 0 | 98.13 | no |
| | High temperature 60° C. | 5 d | 98.12 | no |
| OAD2 dihydro-chloride[2] | Initial | 0 | 99.03 | / |
| | High temperature 60° C. | 5 d | 98.70 | / |
| | 25°C/75+5% RH | 5 d | 99.07 | / |

[1]Crystal form A of OAD2, after 5 day's placement under 25° C./75 ± 5% RH, the sample showed no obvious hygroscopic weight increment.
[2]OAD2 dihydrochloride, after 5 day's placement, the sample showed a hygroscopic weight increment of 8.3%.

The invention claimed is:

1. A crystal form A of (S)-2-(3S,8S)-3-(4-(3,4-dichlorobenzyloxy)phenyl-7-((S)-1-phenylpropyl)-2,3,6,7,8,9-hexahydro-[1,4]-dioxino[2,3-g]isoquinolin-8-ylformylamino)-3-(4-(2,3-dimethylpyridin-4-yl)phenyl)propionic acid free base (OAD2), characterized as having an X-ray powder diffraction pattern comprising diffraction peaks at the following 2θ diffraction angles: 9.53°, 12.32°, 13.80°, 17.84°, 18.56°, 19.40°, 20.38°, 20.99°, 21.78°, and 24.69° as measured using Cu, Kα radiation (form A).

2. The crystal form of claim 1, characterized as having an X-ray powder diffraction pattern comprising substantially the same diffraction peaks at the 2θ diffraction angles as shown in FIG. 1 (form A).

3. A method for preparing the crystal form A of (S)-2-(3S,8S)-3-(4-(3,4-dichlorobenzyloxy)phenyl-7-((S)-1-phenylpropyl)-2,3,6,7,8,9-hexahydro-[1,4]-dioxino[2,3-g]isoquinolin-8-ylformylamino)-3-(4-(2,3-dimethylpyridin-4-yl)phenyl)propionic acid free base (OAD2) of claim 1, the method comprising the following steps:

dissolving (S)-2-(3S,8S)-3-(4-(3,4-dichlorobenzyloxy)phenyl-7-((S)-1-phenylpropyl)-2,3,6,7,8,9-hexahydro-[1,4]dioxino[2,3-g]isoquinolin-8-ylformylamino)-3-(4-(2,3-dimethylpyridin-4-yl)phenyl)propionic acid dihydrochloride in water and organic solvent, neutralizing the mixture with an alkaline solution, precipitating a solid, and filtrating to give the crystal form of OAD2 (form A).

4. The method according to claim 3, wherein the organic solvent is one or two selected from the group consisting of 2-methyltetrahydrofuran, tetrahydrofuran, acetonitrile, and acetone; and/or the organic solvent and water are mixed at a ratio of 1:1; and/or the total volume of the organic solvent and water and the weight of (S)-2-(3S,8S)-3-(4-(3,4-dichlorobenzyloxy)phenyl-7-((S)-1-phenylpropyl)-2,3,6,7,8,9-hexahydro-[1,4]-dioxino[2,3-g]isoquinolin-8-ylformylamino)-3-(4-(2,3-dimethylpyridin-4-yl)phenyl)propionic acid dihydrochloride are at a volume/weight ratio in the range of 4~8:1.

5. The method according to claim 3, wherein in the neutralization, the base is one selected from the group consisting of lithium hydroxide, sodium hydroxide, potassium hydroxide, sodium carbonate, and potassium carbonate, and preferably sodium hydroxide; and/or the temperature of the neutralization and crystallization is in the range of 10~30° C.

6. A pharmaceutical composition comprising 0.001%~99% by weight of the crystal form of OAD2 of claim 1, and a pharmaceutically acceptable carrier.

7. A method of treating diabetes in a patient in need thereof, the method comprising administering to the patient the crystal form A of (S)-2-(3S,8S)-3-(4-(3,4-dichlorobenzyloxy)phenyl-7-((S)-1-phenylpropyl)-2,3,6,7,8,9-hexahydro-[1,4]dioxino[2,3-g]isoquinolin-8-ylformylamino)-3-(4-(2,3-dimethylpyridin-4-yl)phenyl)propionic acid dihydrochloride free base (OAD2) of claim 1.

* * * * *